(12) United States Patent
Von Der Weiden

(10) Patent No.: US 11,446,677 B2
(45) Date of Patent: Sep. 20, 2022

(54) SHREDDING DRUM FOR A CUTTING AND SEPARATING DEVICE

(71) Applicant: SEPAgrind GmbH, Overath (DE)

(72) Inventor: Helmut Von Der Weiden, Feilbingert (DE)

(73) Assignee: SEPAGRIND GMBH, Overath (DE)

( * ) Notice: Subject to any disclaimer, the term of this patent is extended or adjusted under 35 U.S.C. 154(b) by 0 days.

(21) Appl. No.: 17/640,095

(22) PCT Filed: Sep. 7, 2020

(86) PCT No.: PCT/IB2020/058310
§ 371 (c)(1),
(2) Date: Mar. 3, 2022

(87) PCT Pub. No.: WO2021/048726
PCT Pub. Date: Mar. 18, 2021

(65) Prior Publication Data
US 2022/0266258 A1    Aug. 25, 2022

(30) Foreign Application Priority Data

Sep. 9, 2019   (DE) .......................... 102019006334.1

(51) Int. Cl.
*B02C 18/30* (2006.01)
*A22C 17/00* (2006.01)

(52) U.S. Cl.
CPC ........ *B02C 18/305* (2013.01); *A22C 17/0026* (2013.01); *B02C 2018/308* (2013.01)

(58) Field of Classification Search
CPC ... A22C 17/0026; B02C 18/30; B02C 18/301; B02C 18/304; B02C 18/305; B02C 2018/308; B02C 19/22
See application file for complete search history.

(56) References Cited

U.S. PATENT DOCUMENTS

RE32,060 E    12/1985  McFarland
6,622,950 B1   9/2003  Fleming et al.
(Continued)

FOREIGN PATENT DOCUMENTS

DE         102017003406 A1    10/2018

*Primary Examiner* — Adam J Eiseman
*Assistant Examiner* — Bobby Yeonjin Kim
(74) *Attorney, Agent, or Firm* — Hudak, Shunk & Farine Co. LPA

(57) ABSTRACT

A shredding drum for a cutting and separating device, including a pressure housing, on a first end portion of which an inlet opening is formed and on a second end portion of which an outlet opening is formed, wherein a multiplicity of cutting openings are arranged in a pressure housing portion of the pressure housing and pass right through the pressure housing portion from an inner wall to an outer wall, wherein the cutting openings are oriented with hole axes inclined at an angle ($\alpha_{O1}$, $\alpha_{O2}$) in relation to the inner wall. The underlying object was therefore to improve a shredding drum in such a way that the cutting performance of the cutting and separating device and the quality of the desired food ingredient are significantly improved. The object is achieved in that the inclination of the hole axes being chosen such that they are facing the inlet opening on the inner wall.

20 Claims, 3 Drawing Sheets

(56) References Cited

U.S. PATENT DOCUMENTS

| | | |
|---|---|---|
| 2005/0077212 A1 | 4/2005 | Prince et al. |
| 2013/0252523 A1* | 9/2013 | Eisiminger ............ A22C 17/04 |
| | | 452/138 |
| 2018/0071746 A1* | 3/2018 | Wight ................... B02C 18/302 |

\* cited by examiner

SHREDDING DRUM FOR A CUTTING AND SEPARATING DEVICE

FIELD OF THE INVENTION

The invention relates to a shredding drum for a cutting and separating device comprising a pressure housing, on a first end portion of which an inlet opening is formed and on a second end portion of which an outlet opening is formed, wherein a multiplicity of cutting openings are arranged in a pressure housing portion of the pressure housing and pass right through the pressure housing portion from an inner wall to an outer wall, wherein the cutting openings are oriented with hole axes inclined at an angle ($\alpha_{O1}$, $\alpha_{O2}$) in relation to the inner wall. The invention is also implemented in a cutting and separating device.

BACKGROUND OF THE INVENTION

The shredding drum contained in cutting and separating devices are often used in the food industry, in particular for the shredding and further processing of meat. In the food industry, lean meat muscle groups with a low proportion of collagenous tissue are of particular interest when processing meat, for example into sausage products. However, the meat to be processed is usually also interspersed with fatty tissue, collagenous tissue and tendons, which should be sorted out as completely as possible during the comminution and removed from the processing cycle.

Cutting and separating devices according to DE 10 2017 003 406 A1 or U.S. Pat. No. 32,060 E, which have a shredding drum with a pressure housing in which an auger is rotatably mounted, are used to remove these unwanted components. Food to be processed is fed into the pressure housing via an inlet opening, in which softer parts of the food to be processed escape into the cutting openings due to the pressure transmitted to the food by the auger, are cut off as food studs and are pressed out of the pressure cylinder through the cutting openings. This is the food ingredient desired for further processing. Stringy material and unusable solids do not take part in the shredding process and leave the pressure housing through an outlet opening at the end. However, it has been shown that a large proportion of the food to be processed is not comminuted by a separating cut but by squeezing, as a result of which the cutting performance of the cutting and separating device and the quality of the desired food component are not sufficient.

US 2013/0252523 A1 also discloses a cutting device with a pressure housing in which the cutting openings are aligned with an inclined hole axis. The inclination of the axis of the hole runs in the direction of the outlet opening, among other things, in order to further reduce the proportion of bone material in the usable food. In practice, however, it has been found that the cutting performance of the cutting and separating device is insufficient.

SUMMARY OF THE INVENTION

The object of the invention was therefore to improve a shredding drum in such a way that the cutting performance of the cutting and separating device and the quality of the desired food ingredient are significantly improved.

The object is achieved according to the invention with a shredding drum for a cutting and separating device, comprising a pressure housing, on a first end portion of which an inlet opening is formed and on a second end portion of which an outlet opening is formed, wherein a multiplicity of cutting openings are arranged in a pressure housing portion of the pressure housing and pass right through the pressure housing portion from an inner wall to an outer wall, wherein the cutting openings are oriented with hole axes inclined at an angle ($\alpha_{O1}$, $\alpha_{O2}$) in relation to the inner wall, wherein inclination of the hole axes is chosen such that they face the inlet opening on the inner wall. The cutting openings emerge on the inner wall of the pressure housing and, when the cutting and separating device is in operation, perform the majority of the cutting work on the food to be processed. The inclined hole axis of the cutting openings results in a particularly sharp, cutting opening edge with a wedge angle of less than 90° in the transition area between cutting opening and inner wall. On the other hand, on the opposite side of the cutting opening edge, the cutting opening has a drawing-in opening edge with an obtuse angle greater than 90°, into which the foodstuff to be processed migrates particularly favorably.

The inclined hole axes of the cutting openings make it particularly easy to produce the sharp, cutting opening edge and the blunt, drawing-in opening edge.

Advantageously, the angle of the inclined hole axis includes a first angle, which is arranged on the side of the cutting opening facing away from the inlet opening of the pressure housing between the hole axis and the inner wall. At the first angle, the axis of the hole is inclined towards the inlet opening of the pressure housing. In the axial direction of the pressure housing, its radius is expediently aligned with the axis of the hole. Each cutting opening can therefore have, with the inner wall of the pressure housing portion, a cutting opening edge facing the outlet opening and a drawing-in opening edge facing the inlet opening.

Since the food to be processed is advanced from the inlet opening essentially axially through the pressure housing in the direction of the outlet opening, the cutting edge of the cutting opening is formed on the side facing away from the inlet opening of the pressure housing and thus opposes the main direction of movement of the food to be processed. This results in a clean separating cut without significant crushing of the food to be processed.

The first angle is preferably between 60° and 88°, particularly preferably 65° to 85°, very particularly preferably 70 to 80°. The smaller the first angle, the sharper is the cutting opening edge formed from it, which results in a particularly high cutting performance with high quality of the food component desired for further processing. With a smaller first angle, however, the wear-related service life of the shredding drum also decreases.

The hole axes are sensibly aligned in such a way that the cutting opening edge between the inner wall and the hole axis is formed at the first angle. The wedge angle of the cutting opening edge corresponds to the first angle of the associated hole axis.

The angle may comprise a second angle which is located in the circumferential direction of the pressure housing portion between the hole axis and the radius of the pressure housing portion. As a result, the hole axes are additionally inclined in the circumferential direction of the pressure housing portion. As a result, the cutting edge of the cutting opening moves further in the transverse direction from the side of the cutting opening directed towards the outlet opening of the pressure housing and, in the case of a rotating auger, is essentially perpendicular to the foodstuff that is also rotating at least partially.

The second angle is advantageously between 2° and 30°, particularly preferably 5° to 25°, very particularly preferably 10 to 20°. The second angle thus corresponds to the absolute value of the difference between 90° and the first angle.

In the axial direction and/or in the circumferential direction, opening edges of adjacent cutting openings can be aligned with one another in an overlapping manner. This avoids the formation of webs and part of the food to be processed being conveyed through the pressure housing portion without contact with a cutting opening. Advantageously, cutting openings arranged one behind the other in the axial direction are aligned offset to one another in the circumferential direction with an offset angle of 3° to 9°, particularly preferably 4° to 8°, very particularly preferably 5° to 7°.

The invention is also implemented in a cutting and separating device with the shredding drum according to the invention, comprising an auger being rotatably mounted in the pressure housing, comprising a worm shaft with at least one screw flight spirally formed thereon, which in the installed position has a leading flank for the pushing transport of a foodstuff, a trailing flank arranged on the opposite side and at its distal end between the leading flank and the trailing flank a cylindrical section which is formed with a sharpened cutting edge in the transition area to the leading flank of the screw flight.

The worm shaft and the screw flight are preferably designed as a one-piece integral structural unit in order to be able to permanently transmit the operational forces to be expected. The sharpened cutting edge serves in particular to remove any buildup on the inner wall of the pressure housing portion, since otherwise, for example, collagenous meat components will cover the cutting openings and food to be processed will no longer be pressed into the cutting openings and chopped up.

The sharpened cutting edge is preferably formed on a section of the auger which sweeps over the cutting openings. The food to be processed is only chopped up in this area, with the risk of the cutting openings being covered. A feed section of the auger, which can be arranged upstream between the pressure housing portion with the cutting openings made therein and the inlet opening of the pressure housing, does not require a sharpened cutting edge. As a result, the production costs of the auger can be reduced considerably, since the sharpened cutting edge only has to be shaped in sections on the auger.

The cylindrical section of the screw flight can have a width which is at least the diameter of the cutting openings on the inner wall. With this dimensioning and the operational loads to be expected, the screw flight has sufficient strength without reversible deformation. In addition, the cutting performance and quality are favorably influenced, since the piece of meat held in the cutting opening is completely detached from the foodstuff to be processed in the pressure housing portion.

The second angle is expediently aligned counter to a direction of rotation of the auger. As a result, the cutting opening edge of the cutting opening is shifted laterally from the position originally facing the outlet opening and protrudes in the direction of the approaching leading flank of the screw flight as well as the foodstuff to be processed in front of it. In this embodiment too, the drawing-in opening edge is opposite the cutting opening edge and is first swept over by the leading flank of the screw flight. Due to this alignment of the hole axis, the cutting opening is particularly well filled and the food piece already located in the cutting opening is separated particularly cleanly.

It has proven to be particularly favorable if the sharpened cutting edge is formed with a positive rake angle located between the leading flank and a machining plane aligned perpendicular to the worm shaft. The positive rake angle catches behind and removes residues from the food to be processed that get into the effective range of the auger.

The rake angle is preferably between 10° and 50°, particularly preferably 20° and 40°, very particularly preferably between 25° and 35°.

Advantageously, a wedge angle of 40° to 80°, particularly preferably 50° to 70°, very particularly preferably 55° to 65°, is formed between the leading flank and the cylindrical section.

According to a particularly expedient embodiment, a groove is introduced at a distal end of the leading flank, wherein an outer contour of the groove intersects the cylindrical section. In this embodiment, the outer contour of the groove forms the relevant section of the leading flank of the screw flight. In this case, the rake angle is located between the outer contour of the groove and the machining plane. The wedge angle then extends between the outer contour of the groove and the cylindrical section of the screw flight.

A radius or a bevel is expediently arranged between the cylindrical section and the trailing flank. Such a reduction in material reduces the temperature rise in the food to be processed and thereby lowers the bacterial load.

BRIEF DESCRIPTION OF THE DRAWINGS

For better understanding, the invention is explained in more detail below with reference to six Figures showing in FIG. 1: longitudinal section through a cutting and separating device with a shredding drum according to a first embodiment and an auger arranged therein.

DETAILED DESCRIPTION OF THE INVENTION

Figure 1:
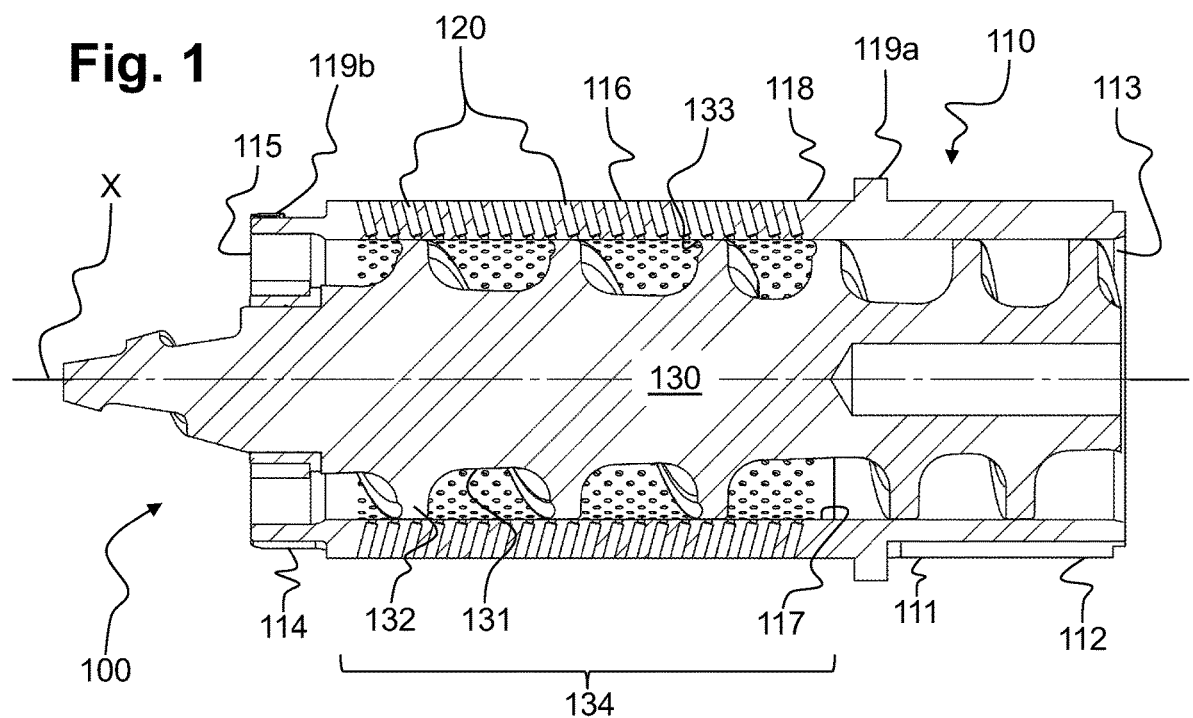

FIG. 1 shows a longitudinal section through a cutting and separating device 100 with a shredding drum 110 and an auger 130 arranged coaxially therein. The shredding drum 110 comprises a pressure housing 111, on the first end portion 112 of which an inlet opening 113 is formed, through which the foodstuff to be comminuted is fed to the shredding drum 110. At the opposite end of the pressure housing 111 there is a second end portion 114 on which an outlet opening 115 is formed, through which sinewy material and unusable solids are conveyed out of the pressure housing 111. The inlet opening 113 and the outlet opening 115 each form opposite, axial openings of the pressure housing 111.

An upstream connection means 119*a* is attached to the first end portion 112 of the pressure housing 111 on the shredding drum 110, via which a detachable connection to a feed channel or a feed hopper (not shown here) can be established. The shredding drum 110 also has, on the second end portion 114 of the pressure housing 111, a downstream connection means 119*b*, to which, for example, a throttle valve (also not shown) for controlling the food pressure within the pressure housing 111 can be attached.

The pressure housing 111 of the shredding drum 110 has a pressure housing portion 116 with a multiplicity of cutting openings 120 which run continuously from an inner wall 117 of the pressure housing portion 116 to an outer wall 118. The food component desired for further processing escapes through the cutting openings 120.

The auger 130 includes a rotatably driven worm shaft 131 whose axis of rotation is aligned with a housing longitudinal axis X of the pressure housing 111. At least one screw flight 132 is formed on the worm shaft 131 and surrounds the worm shaft 131 in a spiral shape in the axial direction. When the worm shaft 131 rotates, due to its pitch, the food in the pressure housing 111 is pushed forward from the inlet opening 113 in the direction of the outlet opening 115. During this process, a pressure builds up inside the food to be processed, which pushes the food to be processed into the cutting openings 120 so that a food stud is formed within the cutting opening 120. Due to the continuous feed movement of the food to be processed applied by the auger 130, the food stud tears off the food remaining in the pressure housing portion 116 and penetrates the pressure housing 111 through the cutting opening 120 to the outside.

However, only in the area of the pressure housing portion 116, i.e. in a sweeping section 134 of the auger 130 sweeping over the cutting openings 120, at its outer end, the screw flight 132 has a sharpened cutting edge 133, the shape and function of which will be explained below in connection with FIG. 4 to FIG. 6.

Figure 2:
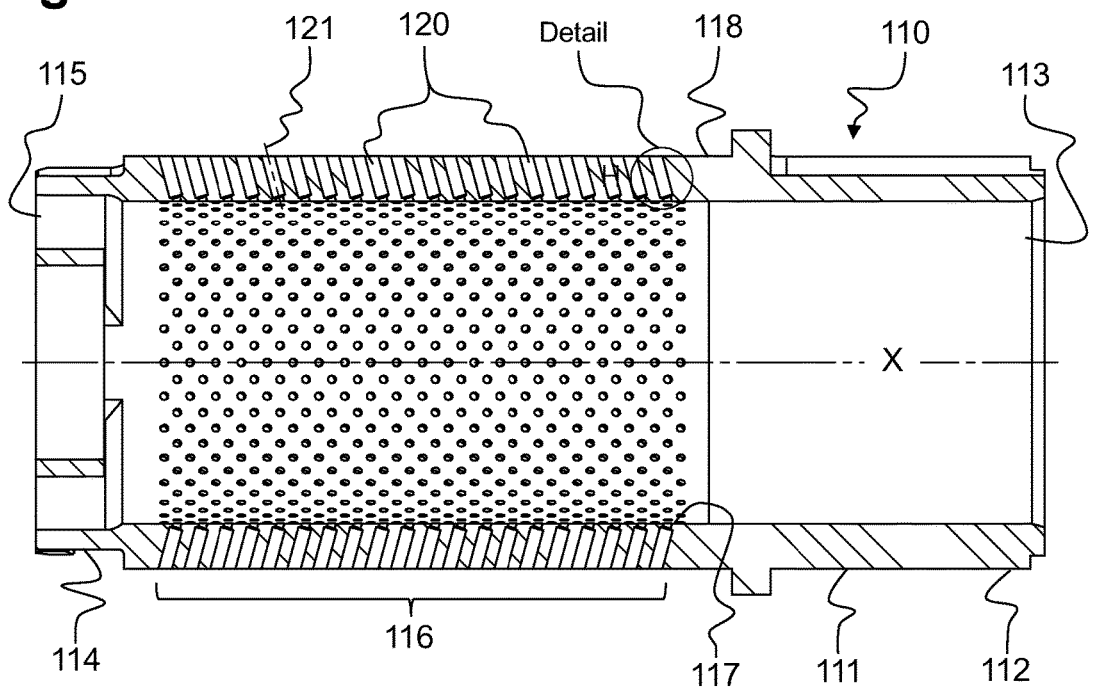
FIG. 2: a longitudinal section through the shredding drum according to FIG. 1, FIG. 3: an enlarged longitudinal section through the detail of FIG. 2.

As can be seen particularly well in FIG. 2, the cutting openings 120 do not run through the pressure housing portion 116 in the radial direction, but are inclined with their hole axis 121. The inclination of the hole axis 121 is selected in such a way that it faces the inlet opening 113 on the inner wall 117.

Figure 3:
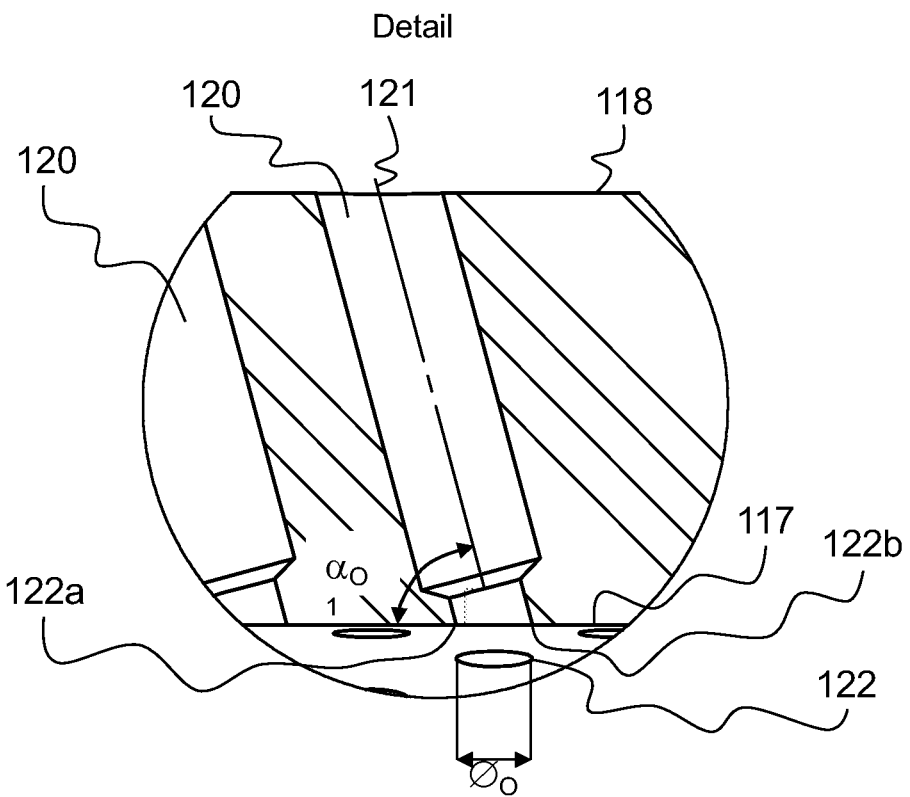

An enlargement of the detail relating to the cutting openings 120, among other things, is shown in FIG. 3. The cutting openings 120 are designed as stepped bores with an outer, larger-diameter cross-section and an inner, smaller-diameter cross-section, whereby the food component required for further processing is heated relatively little and the germ load is reduced, since the food stud already severed in the cutting openings 120 can expand into the larger-diameter cross-section.

However, only the diameter $\varnothing_O$ of the cutting openings 120 arranged in the area of the inner wall 117 is involved in the comminution work of the food to be processed. The hole axis 121 is inclined at a first angle $\alpha_{O1}$. The angle $\alpha_{O1}$ is located on the side of the outlet opening 115 between the hole axis 121 and the inner wall 117 or the longitudinal axis X of the pressure housing 111.

Each cutting opening 120 has a circumferential opening edge 122 in the transition area to the inner wall 117 of the pressure housing portion 116, of which a part facing the outlet opening 115 serves as a cutting opening edge 122a and a part facing the inlet opening 113 as a drawing-in opening edge 122b for the food to be chopped. The inclination of the hole axis 121 at the first angle $\alpha_{O1}$ results in a particularly sharp cutting opening edge 122a at the same acute angle $\alpha_{O1}$. The drawing-in opening edge 122b, on the other hand, has an obtuse angle greater than 90° and thereby promotes the entry of the food to be chopped into the respective cutting opening 120. The size of the obtuse angle of the drawing-in opening edge 122b is 180° minus the first angle $\alpha_{O1}$.

Figure 4:
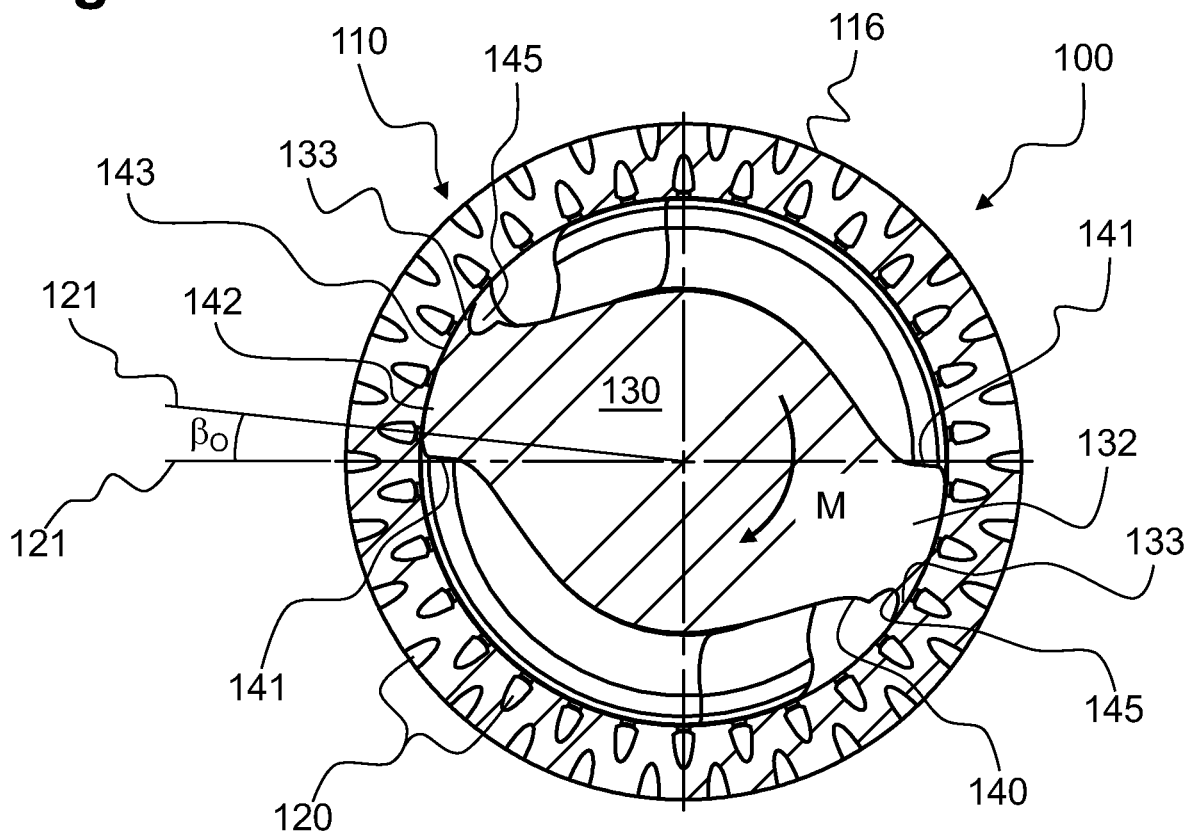
FIG. 4: a cross section through the cutting and separating device according to FIG. 1 in the area of the pressure housing portion.

FIG. 4 shows a cross section through the cutting and separating device 100 with a shredding drum 110 according to a first embodiment, in which the cutting openings 120 run radially towards the longitudinal axis X of the housing in the cross-sectional plane. Cutting openings 120 arranged axially offset in the image plane are arranged in relation to the cutting openings 120 in front of them in the image plane in such a way that their hole axes 121 are aligned offset by an angle $\beta_O$ in the circumferential direction with respect to one another.

The auger 130 rotates in the direction of rotation M, clockwise in the image plane of FIG. 4. The screw flight 132 has a leading flank 140, which is arranged at the front in the direction of rotation M, and a trailing flank 141, which is arranged at the rear in the direction of rotation M. A cylindrical section 143 can be seen between the leading flank 140 and the trailing flank 141 at each distal end 142 of the screw flight 132, which is shaped complementary to the inner wall 117 of the pressure housing portion 116.

The sharpened cutting edge 133 comprises a groove 145 placed in the leading flank 140, wherein the outer contour 146 (FIG. 5) of which adjoins the cylindrical section 143 and merges into it. The groove 145 is formed equidistant to the cylindrical section 143 over the axial course of the auger 130 and extends over the entire section 134 sweeping over the cutting openings 120.

With the help of the sharpened cutting edge 133, in particular, adhesions of the food to be processed on the inner wall 117 of the pressure housing portion 116 can be peeled off, so that they do not permanently lie over the cutting openings 120 and thereby prevent the food to be processed from entering the cutting openings 120. Such adhesions usually consist of collagenous material, which has up to twenty times the strength of lean meat and hardly penetrates into the cutting openings 120 due to its high strength.

Buildup peeled off by the sharpened cutting edge 133 is transported in the direction of the outlet opening 115 and removed there from the shredding drum 110.

Figure 5:
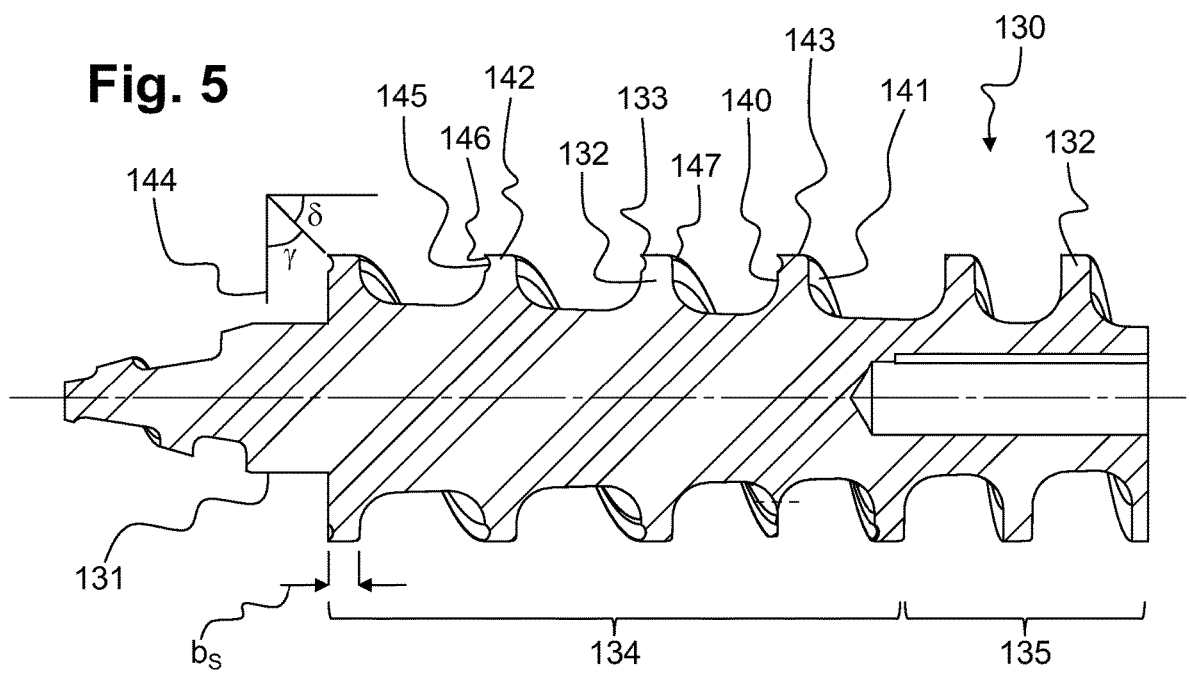
FIG. 5: a longitudinal section through the auger according to FIG. 1 and FIG. 6: a cross section through the cutting and separating device with a shredding drum according to a second embodiment in the area of the pressure housing portion.
Figure 6:
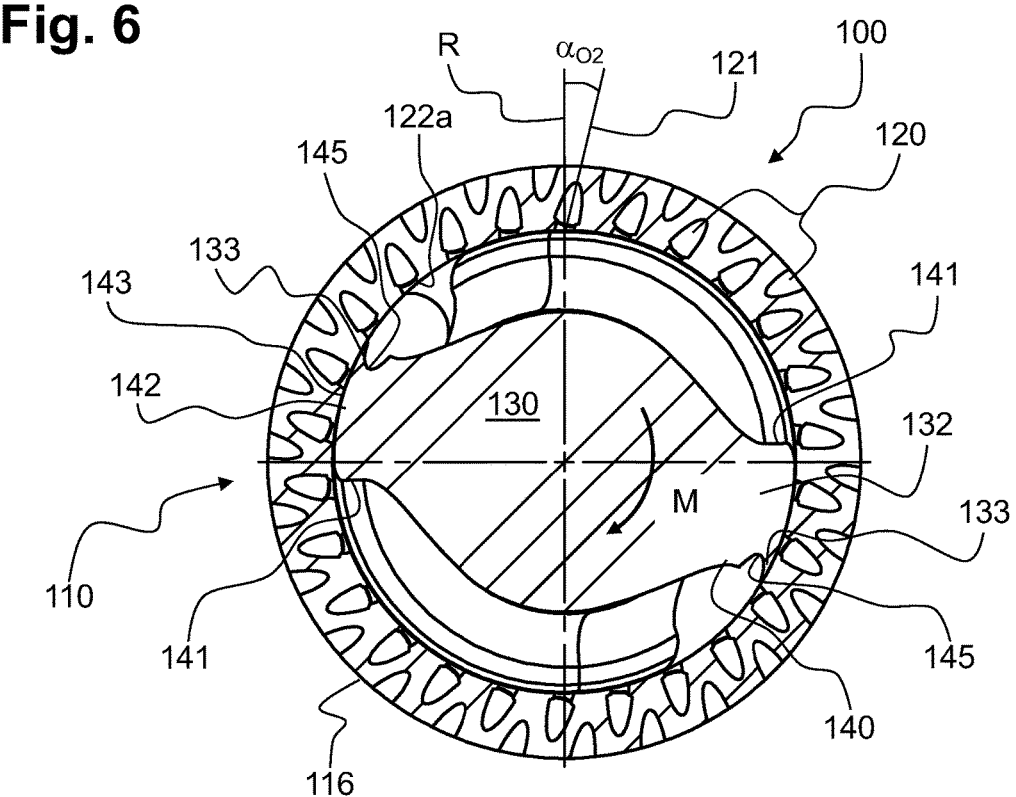

In a longitudinal section through the auger 130, FIG. 5 shows that the sharpened cutting edge 133 is formed from the outer contour 146 of the groove 145 and the cylindrical section 143. The sharpened cutting edge 133 has a rake angle γ that is spanned between a machining plane 144 that is perpendicular to the axial extension of the auger 130 and the outer contour 146 of the groove 145. A wedge angle δ is arranged between the outer contour 146 of the groove 145 and the cylindrical section 143 of the screw flight 132. Since the clearance angle is always 0° due to the cylindrical section 143 of the screw flight 132, the sum of the rake angle γ and the wedge angle δ is always 90°.

The sharpened cutting edge 133 is only present in the sweeping section 134 traversing the cutting openings 120. In a feeding section 135 of the auger 130, which protrudes beyond the pressure housing 111 of the shredding drum 110 between the pressure housing portion 116 with the cutting openings 120 and the inlet opening 113, the auger 130 only has a conventional screw flight 132, which has a cutting edge being designed for example with a rake angle γ of 90°. Since there are no cutting openings 120 in the pressure housing 111 in this area, they are not clogged by adhesions of the food to be processed and consequently do not have to be removed from the sharpened cutting edge 133 of the auger 130.

For a high cutting performance of the cutting and separating device 100, the screw flight 132 in the area of the section 134 sweeping over the cutting openings 120 has a width $b_S$ that corresponds at least to the diameter $\varnothing_O$ of the cutting openings 120 on the inner wall 117 of the pressure housing portion 116. The width $b_S$ forms the perpendicularly distance between the leading flank 140 and the trailing flank 141 of the screw flight 132.

A bevel 147 is formed in the transition area between the cylindrical section 143 of the screw flight 132 and the associated trailing flank 141, which also contributes to reducing the heating of the food to be processed, Instead of a bevel 147, a radius or another geometric shape can also be provided in the transition area between the cylindrical section 143 and the trailing flank 141: it is always essential that there is a reduction in the material of the screw flight 132 in this area. The bevel 147 runs in accordance with the groove 145 exclusively in the sweeping section 134 of the auger 130 that sweeps over the cutting openings 120.

Fla 6 shows a cross section through the cutting and separating device 100 with a shredding drum 110 according to a second embodiment in the area of the pressure housing portion 116. The cutting openings 120 introduced therein have hole axes 121 which, in addition to the first angle $\alpha_{O1}$, are also inclined with a second angle $\alpha_{O2}$.

The second angle $\alpha_{O2}$ is applied laterally to the radius R of the pressure housing portion 116 and is thus spanned in the circumferential direction of the pressure housing portion 116. The hole axis 121, which is additionally inclined at the second angle $\alpha_{O2}$ according to the second embodiment, runs in the direction of the inner wall 117 counter to the direction of rotation M of the auger 130, so that the cutting openings 120 have a cutting opening edge 122a on their side facing away from the leading flank 140 of the screw flight 132. The inclination of the hole axis 121 at the second angle $\alpha_{O2}$ results in an equally sharp cutting opening edge 122a between the inner wall 117 of the pressure housing portion 116 and the cutting opening 120 at the same acute angle $\alpha_{O2}$.

LIST OF REFERENCE NUMBERS 100 cutting and separating device
110 shredding drum
111 pressure housing
112 first end portion pressure housing
113 inlet opening
114 second end portion pressure housing
115 outlet opening
116 pressure housing portion
117 inner wall pressure housing portion
118 outer wall pressure housing portion
119a upstream connection means
119b downstream connection means
120 cutting openings
121 hole axis cutting openings
122 opening edge
122a cutting edge
122b drawing-in edge
130 auger
131 worm shaft
132 screw flight
133 sharpened cutting edge
134 cutting openings sweeping section
135 feeding section
140 leading flank screw flight
141 trailing flank screw flight
142 distal end of screw flight
143 cylindrical section of screw flight
144 machining plane
145 groove
146 outer contour groove
147 bevel
$b_S$ width of screw flight
direction of rotation auger
R radius pressure housing portion
X housing longitudinal axis
$\alpha_{O1}$ first angle hole axis cutting openings
$\alpha_{O2}$ second angle hole axis cutting openings
$\beta_O$ offset angle cutting openings
$\varnothing_O$ diameter cutting openings
$\gamma$ rake angle cutting edge
$\delta$ wedge angle cutting edge

What is claimed is:

1. A shredding drum for a cutting and separating device, comprising:
a pressure housing having a first end portion, a second end portion and a pressure housing portion therebetween, wherein the first end portion forms an inlet opening and the second end portion forms an outlet opening, wherein the pressure housing portion includes an inner wall, an outer wall and a multiplicity of cutting openings passing through the inner wall to the outer wall, wherein each cutting opening is oriented with a hole axis inclined at an angle in relation to the inner wall such that the distance between an inner wall side of the cutting opening and the inlet opening is smaller than the distance between an outer wall side of the cutting opening and the inlet opening.

2. The shredding drum according to claim 1, wherein the angle comprises a first angle which is arranged on the side of the cutting opening facing away from the inlet opening between its hole axis and the inner wall.

3. The shredding drum according to claim 2, wherein the first angle is between 60° and 88°.

4. The shredding drum according to claim 1, wherein each cutting opening on the inner wall has a cutting opening edge facing the outlet opening and a drawing-in opening edge facing the inlet opening.

5. The shredding drum according to claim 1, wherein the angle comprises a second angle which is located in the circumferential direction of the pressure housing portion between the hole axis and the radius of the pressure housing portion.

6. The shredding drum according to claim 5, wherein the second angle is between 2° and 30.

7. The shredding drum according to claim 1, wherein opening edges of adjacent cutting openings are aligned to overlap one another in the axial direction and/or in the circumferential direction.

8. The shredding drum according to claim 1, wherein the cutting openings arranged one behind the other in the axial direction are offset from one another in the circumferential direction with an offset angle of 3° to 9.

9. A cutting and separating device comprising:
the shredding drum according to claim 1,
wherein an auger is rotatably mounted in the pressure housing, comprising a worm shaft with at least a screw flight spirally formed thereon, which in the installed position has a leading flank for transporter a foodstuff, a trailing flank arranged on an opposite side, and a cylindrical section at a distal end between the leading flank and the trailing flank, wherein the cylindrical section has a sharpened cutting edge in a transitional area to the leading flank of the screw flight.

10. The cutting and separating device according to claim 9, wherein the sharpened cutting edge is formed on a sweeping section of the auger which sweeps over the cutting openings.

11. The cutting and separating device according to claim 9, wherein the cylindrical section of the screw flight has a width which is at least the diameter of the cutting openings on the inner wall.

12. The cutting and separating device according to claim 9, wherein the angle comprises a second angle which is located in the circumferential direction of the pressure housing portion between the hole axis and the radius of the pressure housing portion, and wherein the second angle is aligned counter to a direction of rotation of the auger.

13. The cutting and separating device according to claim 9, wherein the sharpened cutting edge is formed with a positive rake angle located between the leading flank and a machining plane perpendicular to the worm shaft.

14. The cutting and separating device according to claim 9, wherein a groove is formed at a distal end of the leading flank, wherein an outer contour of the groove intersects the cylindrical section.

15. The cutting and separating device according to claim 9, wherein a radius or a bevel is arranged between the cylindrical section and the trailing flank.

16. The shredding drum according to claim 3, wherein each cutting opening on the inner wall has a cutting opening edge facing the outlet opening and a drawing-in opening edge facing the inlet opening, and wherein the angle comprises a second angle which is located in the circumferential direction of the pressure housing portion between the hole axis and the radius of the pressure housing portion.

17. The shredding drum according to claim 16, wherein the second angle is between 2° and 30, wherein opening edges of adjacent cutting openings are aligned to overlap one another in the axial direction and/or in the circumferential direction, and wherein the cutting openings arranged one behind the other in the axial direction are offset from one another in the circumferential direction with an offset angle of 3° to 9.

18. The cutting and separating device according to claim 10, wherein the cylindrical section of the screw flight has a width which is at least the diameter of the cutting openings on the inner wall, wherein the angle comprises a second angle which is located in the circumferential direction of the pressure housing portion between the hole axis and the radius of the pressure housing portion, and wherein the second angle is aligned counter to a direction of rotation of the auger.

19. The cutting and separating device according to claim 18, wherein the sharpened cutting edge is formed with a positive rake angle located between the leading flank and a machining plane perpendicular to the worm shaft, and wherein a groove is formed at a distal end of the leading flank, wherein an outer contour of the groove intersects the cylindrical section.

20. The cutting and separating device according to claim 19, wherein a radius or a bevel is arranged between the cylindrical section and the trailing flank.

* * * * *

UNITED STATES PATENT AND TRADEMARK OFFICE
CERTIFICATE OF CORRECTION

PATENT NO. : 11,446,677 B2
APPLICATION NO. : 17/640095
DATED : November 8, 2022
INVENTOR(S) : Helmut Von Der Weiden It is certified that error appears in the above-identified patent and that said Letters Patent is hereby corrected as shown below:

In the Claims

In Claim 9, Column 8, Line 58, delete "transporter" and insert -- transporting --.

Signed and Sealed this
Thirteenth Day of December, 2022

Katherine Kelly Vidal
*Director of the United States Patent and Trademark Office*